United States Patent Office 3,428,581
Patented Feb. 18, 1969

3,428,581
RESINOUS MATERIAL, INTERMEDIATE AND PROCESSES OF MAKING THEM
Robert L. Purper, Levittown, Pa., assignor to The Bendix Corporation, Sidney, N.Y., a corporation of Delaware, and Vulcanized Rubber and Plastics Company, Morrisville, Pa., a corporation of Maine
No Drawing. Filed Sept. 29, 1965, Ser. No. 491,410
U.S. Cl. 260—5  9 Claims
Int. Cl. C08d 7/02; H01b 3/28; C08c 11/18

ABSTRACT OF THE DISCLOSURE

Resilient rubbery resins for use in electrical connectors having superior dielectric strength, light color, high resistance to heat, good size recovery after compression, substantial hardness, and superior tensile strength manufactured by curing with a peroxide crosslinking agent a mixture of a ethylene propylene terpolymer, an unsaturated elastomer such as styrene butadiene rubber and crosslinked polyethylene, having a filler of submicron silica and talc.

---

This invention relates to the manufacture of resilient rubbery resins which have a broad field of use as inserts for electrical connectors and for other uses in which superior electrical qualities, light color, high resistance to heat, good size recovery after compressions, substantial hardness, and superior tensile strength are desired. As the invention finds a large use as a connector insert, it will be described in that use without limiting the generality of its application to other fields. The nature of this use is set forth in the patent to Uline et al., 2,563,762, Aug. 7, 1951. The conditions of use which these rubbers must withstand are onerous, they are employed in military aircraft and rocketry, and have been used in the Atlas missile, including 14 consecutive, successful launches in one year with a 100% reliability record.

An object of the invention is to still further improve materials which are already of superior grade. Specifically, the objects of the invention are to provide rubbery resins of excellent electrical properties, superior in important respects to any known nonblack resin, which are superior to those of the standard synthetic rubbers, which will be wholly useful at temperatures up to 300° F., and will continue to function even up to 350°–400° F. Other objects are to increase the rate and shorten the time of curing such rubbers, to increase hardness while reducing the quantity of mineral fillers employed, to vulcanize and cure without sulphur, and to eliminate the tarnishing of silver and gold contacts in connector assemblies which use the material. Other objects are to reduce molding shrinkage, to provide extended shelf life, to inhibit the oxidation of the blended composition, to eliminate after-curing, to provide low compression set even when in a press-cured state, and especially to provide rubbery resins which have tensile strength superior to prior art types.

The objects of the invention are accomplished generally speaking by a vulcanizable composition having a shelf life of months comprising a major quantity of ethylene propylene terpolymer, and a minor quantity of styrene butadiene rubber and crosslinked polyethylene, and also including auxiliary agents for crosslinking, vulcanizing and curing, antioxidants, and fillers; by a vulcanized resilient, resinous composition, being the product of copolymerization and curing of a major quantity of ethylene propylene terpolymer and a minor quantity of styrene butadiene rubber and crosslinked polyethylene, a filler, an antioxidant, and an alkyl peroxy catalyst; and by the method of preparing a polymerizable, vulcanizing composition having shelf life of several months which comprises mixing on a roll mill at a temperature of about 200°–250° F. about 70–90 parts by weight of ethylene propylene terpolymer, about 2–6 parts of unsaturated elastomer, and crosslinked polyethylene, cooling the mass, mixing therewith, in the cold, about 15–35 parts of submicronic hydrated silica, about 15–35 parts of hydrous magnesium silicate, about 1–5 parts of polytrimethyl dihydroquinoline, about 5–20 parts of zinc oxide, and about 6–10 parts of dicumyl peroxide.

The materials used include any ethylene propylene terpolymer. These polymers are well known and are commercially available on the market. They are polymerizable thermoplasts having polymerizable double bonds which permit further polymerization and crosslinking. Approximately 75 of these commercially available terpolymers have been used with success but those which have a viscosity circa 40 Mooney have had superior effect in some uses, producing high-mold hardness, on the order of 80–82 Shore A, as well as other beneficial properties which appear in the final product.

A second ingredient is unsaturated elastomer, of which styrene butadiene rubber is preferred. These rubbers are also known, and are polymerizable compositions which copolymerize with the terpolymer and promote vulcanization. Natural rubber can be used to replace the styrene butadiene rubber as it also has unsaturated linkages which enable it to be copolymerized. Polyisoprene is also available as a substituent for some uses. These materials should be limited to quantities equivalent to the quantities of styrene butadiene rubber recited, and should not be used in excess. Amounts equivalent to those stated increase the cure rate whereas excess hinders vulcanization.

The third resinous ingredient in this composition is crosslinked polyethylene, which is copolymerizable with the terpolymer and the styrene butadiene resin. This material imparts an increased cure rate, increases hardness, allows for a reduction in certain mineral fillers, and contributes to a reduction in the staining of contacts. For some uses crosslinked polyethylene having a melt index of about 2.1 and density about 0.922, both of which are low among the variants of this material, have proved to have some superiority, particularly in that they blend readily into the hot batch mixture. For other uses any crosslinked polyethylene is satisfactory.

The composition also contains a crosslinking agent and for this purpose dicumyl peroxide has proved to be superior, being substantially more efficient than available substituents. Among the substituents are 2,5-bis(terbutylperoxy)-2,5 dimethylhexane. Other high-temperature activated peroxides are also available as substitutes for some uses.

To promote curing, the composition should include zinc oxide and a polymerized trimethyl dihydroquinoline, of which the latter increases the cure rate and acts as an antioxidant. The preferred type of zinc oxide is that known as rubber grade zinc oxide.

In addition to the ingredients already listed the compound contains two fillers, one a submicron silica and the other a micron talc. The particle size of the submicron silica may conveniently be on the order of 0.02 micron and the particle size of the talc may be upward of 1 micron. The silica is hydrated; the talc is hydrous magnesium silicate. The silica should be around 87% $SiO_2$ and may have traces of other materials such as CaO, $Fe_2O_3$, $Al_2O_3$, NaCl, of which the latter may slightly exceed 1%. It is to be understood that material of this quality is expressly recommended when the highest quality of product is desired, but that other silicas can be used in less critical situations. The talc should be 98–99% hydrous magnesium silicate, and the maximum particle size should not substantially exceed 8 microns. The free moisture should be around 0.1 to 0.3% and magnetizable iron and salts of heavy metals should be absent when the highest quality product is desired, but when the finest properties are not required, less refined talcs may be used. The fillers add to tensile and tear strength, and these particular fillers are less cure-retarding than other mineral fillers. For preferred service there are no satisfactory substituents for submicron silica and micron talc. These materials also reduce the shrinkage in the mold compared to other type fillers.

When it is desired to color the composition, some carbon black can be added, usually only enough to produce a steel gray color. This is used only for appearance, and does not affect the qualities of the material.

In the following table is set forth in parts by weight a preferred composition and the range of each ingredient:

| Ingredient | Preferred Formula | Substantial Limits |
|---|---|---|
| Ethylene propylene terpolymer | 85 | 70–90 |
| Crosslinked polyethylene | 15 | 10–30 |
| Zinc oxide | 10 | 5–20 |
| Dicumyl peroxide | 6.75 | 5–10 |
| Submicron silica | 25 | 15–35 |
| Vapor talc (micron) | 25 | 15–35 |
| Styrene butadiene rubber | 3 | 2–6 |
| Polymerized trimethyl dihydroquinoline | 2 | 1–5 |

In preparing the compound the selected weight of terpolymer is rolled on a steam-heated roll mill at temperatures between 200°–250° F. The styrene butadiene resin is then mixed in on the same roll and the crosslinked polyethylene is worked in until a homogeneous blend is produced. This material is then removed from the rolls and allowed to cool to room temperature. When cooled this master batch is worked up on a water cooled two-roller mill and the remaining ingredients are dispersed in the order, silica, talc, coloring matter, if used, dihydroquinoline (antioxidant), zinc oxide, and the crosslinking, dicumyl peroxide, catalyst.

This composition of matter can be stored, having a shelf life of from 3–6 months depending on storage conditions. When used, the compound is molded or otherwise formed to shape and vulcanized under clamping pressure (this is called "pressure cure") for 10–20 minutes at 300–350° F., a preferred cycle for the preferred formula being 15 minutes at 320° F. The correct charge of rubber to be used is determined by experimenting with charges of different size so that the mold will be filled to capacity with a minimum of overflow at the bleeders. These materials have been cured at pressures up to 50 tons on a 15 x 15 platen and it is customary to cure at between 200 and 500 p.s.i. If desired, the demolded parts can be after-cured in an oven at 250°–300° F. for from 8–24 hours. This is desirable only for particular end uses. The final product of the example had the qualities:

As press cured:
   Tensile strength, p.s.i. _____ 2313
   Ultimate elongation, percent _____ 640
   Durometer hardness, A _____ 82–80
   Stress at 300%, p.s.i. _____ 743
After oven aging, 70 hrs. at 212° F.:
   Tensile strength, p.s.i. _____ 1790
   Ultimate elongation, percent _____ 517
   Durometer hardness, A _____ 83
   Stress at 300%, p.s.i. _____ 960
After oven aging, 70 hrs. at 300° F., foil wrapped:
   Tensile strength, p.s.i. _____ 1970
   Ultimate elongation, percent _____ 450
   Durometer hardness, A _____ 83
   Stress at 300%, p.s.i. _____ 1273
Compression set, 70 hrs. at 250° F.:
   Percent set _____ 37.4
Compression set, 70 hrs. at 300° F.:
   Percent set _____ 46.9
Arc resistance, avg. 10 reading:
   Arc-seconds _____ 145.6

An outstanding characteristic of this new material, compared to other nonblack, nonsulphur-bearing materials having an ethylene propylene terpolymer base, is that the prior art materials have tensile strengths from 500 to a maximum of 1500 p.s.i. whereas the new material is far superior even after thermal aging at 300° F.

Other advantages of the new material are that it has high hardness without after cure, low compression set even in the press cured state, extraordinary resistance values even after thermal aging and even at elevated temperatuers, extraordinary arc resistance, and the elimination of staining or corrosion of electrical contacts.

Other advantages are that the objects stated hereinabove have been attained.

Although only a limited number of embodiments of the invention has been described in the foregoing specification, it is to be expressly understood that various changes may be made therein without departing from the spirit and scope of the invention as will now be apparent to those skilled in the art.

What is claimed is:

1. A vulcanizable composition having a shelf life of months consisting essentially of 85 parts by weight of an ethylene propylene terpolymer having a viscosity of circa 40 Mooney, 3 parts by weight of styrene butadiene rubber and 15 parts by weight of a crosslinked polyethylene, having a melt index of about 2.1 and a density of about 0.922, and including as auxiliary agents for crosslinking, vulcanizing and curing, 6.75 parts by weight of dicumyl peroxide and 10 parts by weight of rubber grade zinc oxide, for antioxidizing 2 parts by weight of polymerized trimethyl dihydroquinoline, and for filling 25 parts by weight of submicron silica and 25 parts by weight of micron talc.

2. A vulcanizable composition having a shelf life of months which consists essentially of:

| | Parts by weight |
|---|---|
| Ethylene propylene terpolymer | 70–90 |
| Styrene butadiene rubber | 2–6 |
| Crosslinked polyethylene | 10–30 |
| Dicumyl peroxide | 5–10 |
| Polytrimethyl dihydroquinoline | 1–5 |
| Zinc oxide | 5–20 |
| Submicronic hydrous silica | 15–35 |
| Micronic hydrous magnesium silicate | 15–35 |

3. A vulcanizable composition having a shelf life of months which consists essentially of a resinous crosslinkable mixture of an ethylene propylene terpolymer, a crosslinked polyethylene, an unsaturated elastomer selected from the group consisting of styrene butadiene rubbers, natural rubbers and polyisoprene, and additionally crosslinking agents, comprising an organic peroxide and zinc oxide, an anti-oxidant, and a filler of submicronic silica and micron talc, the ethylene propylene terpolymer being present in 70 to 90 parts by weight, the crosslinked polyethylene being present in 10 to 30 parts by weight, and the unsaturated elastomer being present in 2 to 6 parts by weight.

4. A vulcanized resilient, resinous composition, being the product of copolymerization and curing of a major quantity of ethylene propylene terpolymer and a minor quantity of styrene butadiene rubber and crosslinked polyethylene, a filter, an antioxidant, and an alkyl peroxy catalyst, of the composition set forth in claim 1.

5. A vulcanized resilient, resinous copolymer comprising a major quantity of ethylene propylene terpolymer, and a minor quantity of crosslinked polyethylene and unsaturated elastomer, which incorporates a filler, an antioxidant, and is the product of copolymerization and curing of the composition of claim 3.

6. A vulcanized resilient, resinous composition being the product of copolymerization and curing, in parts by weight, of the composition consisting essentially of:

| | Parts by weight |
|---|---|
| Ethylene propylene terpolymer | 70–90 |
| Crosslinked polyethylene | 10–30 |
| An unsaturated elastomer selected from the group consisting of styrene butadiene rubber, natural rubber, and polyisoprene | 2–6 |
| Hydrated silica | 15–35 |
| Hydrous magnesium silicate | 15–35 |
| Alkyl peroxide catalyst | 5–10 |
| Polymerized trimethyl dihydroquinoline | 1–5 |
| Zinc oxide | 5–20 |

7. The method of preparing a polymerizable, vulcanizable composition having a shelf life of several months which comprises, mixing on a roll mill at a temperature of about 200°–250° F., about 2–6 parts of an unsaturated elastomer selected from the group consisting of styrene butadiene rubber, natural rubber and polyisoprene, and about 10–30 parts of crosslinked polyethylene, cooling the mass, mixing therewith, in the cold, about 15–35 parts of submicronic hydrated silica, about 15–35 parts of hydrous magnesium silicate, about 1–5 parts of polymeric trimethyl dihydroquinoline, about 5–20 parts of zinc oxide, and about 5–10 parts of dicumyl peroxide, all said parts being by weight.

8. The method of preparing a polymerizable, vulcanizable composition having a shelf life of several months which comprises mixing on a roll mill at a temperature of about 200°–250° F. about 70–90 parts by weight of ethylene propylene terpolymer, about 2–6 parts by weight of a styrene butadiene rubber, and about 15–35 parts by weight of a crosslinked polyethylene, cooling the mass, mixing therewith in the cold, an antioxidant, a peroxide curing agent and zinc oxide.

9. The method of preparing a polymerizable vulcanizable composition having a shelf life of several months, which comprises, mixing on a roll mill at a temperature of about 200°–250° F., about 70–90 parts by weight of ethylene propylene terpolymer, about 2–6 parts by weight of an unsaturated elastomer selected from the group consisting of styrene butadiene rubbers, natural rubbers, and polyisoprene, and about 15–35 parts by weight of crosslinked polyethylene, cooling the mass, mixing therewith, in the cold, zinc oxide in about 5–20 parts by weight, and dicumyl peroxide in about 5–10 parts by weight.

References Cited

UNITED STATES PATENTS

| | | | |
|---|---|---|---|
| 2,912,410 | 11/1959 | Cole | 260—45.5 |
| 3,039,989 | 6/1962 | Eastman | 260—41 |

OTHER REFERENCES

Nordel—a sulfur - curable ethylene - propylene elastomer—Du Pont catalog (April 1964), pp. 3, 13, 15, and 25.
Waddell et al.—Rubber Age 94, 435 (1963).

MORRIS LIEBMAN, *Primary Examiner.*

H. H. FLETCHER, *Assistant Examiner.*

U.S. Cl. X.R.

260—41.5, 889, 897, 45.8, 45.9